United States Patent
Larson

[11] Patent Number: 5,903,776
[45] Date of Patent: May 11, 1999

[54] MULTIPLE PRIORITY ACCELERATED GRAPHICS PORT (AGP) REQUEST QUEUE

[75] Inventor: Douglas A. Larson, Minneapolis, Minn.

[73] Assignee: Micron Electronics, Inc., Nampa, Id.

[21] Appl. No.: 08/924,756

[22] Filed: Sep. 5, 1997

[51] Int. Cl.⁶ .................................................. G06F 13/18
[52] U.S. Cl. ........................ 395/874; 395/864; 395/732
[58] Field of Search ................................. 395/825–827, 395/840–841, 864, 878, 732, 737, 485, 872, 876, 478

[56] References Cited

U.S. PATENT DOCUMENTS

| | | | |
|---|---|---|---|
| 4,933,901 | 6/1990 | Tai et al. | 365/189.07 |
| 5,485,586 | 1/1996 | Brash et al. | 395/292 |
| 5,625,846 | 4/1997 | Kobayakawa et al. | 395/872 |
| 5,649,157 | 7/1997 | Williams | 395/478 |
| 5,657,055 | 8/1997 | Kansal et al. | 345/189 |
| 5,657,472 | 8/1997 | Van Loo et al. | 395/485 |
| 5,721,833 | 2/1998 | Cooperman et al. | 395/876 |
| 5,790,813 | 8/1998 | Whittaker | 395/293 |
| 5,819,105 | 10/1998 | Moriarty et al. | 395/825 |

OTHER PUBLICATIONS

"Accelerated Grahics Port Interface Specification," Intel Corporation, 1996, pp. 1–151.

*Primary Examiner*—Christopher B. Shin
*Attorney, Agent, or Firm*—Seed and Berry LLP

[57] ABSTRACT

A single queuing structure enqueues requests of multiple priorities. The queuing structure is especially well adapted for use with requests that are part of AGP operations. For instance, the queuing structure may enqueue low priority read requests, high priority read requests, low priority write requests, and high priority write requests. The queuing structure may be logically partitioned into logical sub-queues where each sub-queues is associated with requests of a given type and a given priority. Each of the logical sub-queues may be configured to operate in a first-in-first-out (FIFO) fashion. Separate pointers may be maintained for identifying the bottom of each of the logical sub-queues within the single queuing structure.

21 Claims, 18 Drawing Sheets

MULTIPLE PRIORITY ACCELERATED GRAPHICS PORT (AGP) REQUEST QUEUE

TECHNICAL FIELD

The present invention relates generally to computer systems and more particularly to a multiple priority Accelerated Graphics Port (AGP) request queue.

BACKGROUND OF THE INVENTION

The peripheral component interconnect (PCI) specification has been widely adopted in conventional computer systems. The PCI specification defines a local bus system, that includes a PCI bus and a PCI controller for regulating access to the bus. The PCI bus may be connected to different peripheral devices via expansion cards and data may be exchanged between the peripheral devices and a central processing unit (CPU) over the PCI bus. The peripheral devices may seek access to memory locations in main memory over the PCI bus by sending requests to a system memory controller. Each such request to access the system memory is sent as part of a memory access transaction in a non-pipelined fashion. In particular, for each memory access transaction, a memory request is sent from a sender over the PCI bus to the system memory controller, and the sender waits on the request until a response is received. This approach has proven to be especially cumbersome for memory intensive applications, such as three-dimensional rendering, that require a great deal of bandwidth. Unfortunately, the PCI bus does not readily facilitate such a great deal of bandwidth. As a result, the PCI bus serves as a substantial bottleneck for quickly rendering three-dimensional images.

In response to the limitations of the PCI specification, Intel Corporation has established the Accelerated Graphics Port (AGP) specification. AGP is a high performance component level interconnect that is designed for use with three-dimensional graphic display applications. The AGP specification identifies an AGP bus and interface requirements for AGP compliant devices. AGP is based upon a set of performance extensions of the PCI specification that provide increased bandwidth to help better facilitate the large memory bandwidth requirements that are necessary for three-dimensional rendering. AGP provides three primary areas of extensions relative to PCI. First, memory read and write operations are pipelined to hide memory access latency. Second, address data is demultiplexed on the bus to enhance bus efficiency and third, AC timing is provided for 133 MHz data transfer rates.

SUMMARY OF THE INVENTION

The present invention provides a single queue structure for enqueuing requests of multiple priorities. The queuing structure is especially well adapted for use with requests that are part of AGP operations. For instance, the queuing structure may enqueue low priority read/flush requests, high priority read requests, low priority write requests, and high priority write requests. The queuing structure may be logically partitioned into logical sub-queues where each sub-queues is associated with requests of a given type and a given priority. Each of the logical sub-queues may be configured to operate in a first-in-first-out (FIFO) fashion. Separate pointers may be maintained for identifying the bottom of each of the logical sub-queues within the single queuing structure.

In accordance with a first aspect of the present invention, a computer system includes an AGP bus. The computer system also includes an AGP-compliant master device that has an interface for generating low priority read requests, high priority read requests, low priority write requests, and high priority write requests. The computer system additionally includes an AGP-compliant target device that has an interface for interpreting a request generated by the AGP-compliant master device. An AGP request queue is provided on the AGP-complaint master device for enqueuing the requests.

In accordance with another aspect of the present invention, a computer system has a memory that is responsive to read requests and write requests of multiple priorities. A single queue structure is provided for enqueuing the read requests and the write requests. The queuing structure includes a lower priority logical sub-queue for holding lower priority requests in a FIFO fashion and a higher priority sub-queue for holding higher priority requests in a FIFO fashion. All of the higher priority requests stored in the higher priority sub-queue must be removed from the queue before any of the lower priority requests can be removed from the lower priority sub-queue.

In accordance with a further aspect of the present invention, a queue includes a first end to which requests of first type are popped and pushed and a second end to which requests of second type are popped and pushed. The queue has a first low priority logical sub-queue at the first end for storing low priority requests of the first type. A first high priority logical subdue is provided at the first end for storing high priority requests of the first type. The high priority requests are positioned outward in the queue towards the first end relative to where the low priority request of the first type are positioned in the queue.

BRIEF DESCRIPTION OF THE DRAWINGS

An exemplary embodiment to the present invention will be described below relative to the following figures.

DETAILED DESCRIPTION OF THE INVENTION

The exemplary embodiment of the present invention described below provides a single structure for enqueuing high priority read/write requests and low priority read/write requests that are part of AGP memory access transactions. The structure is a queue for holding read/flush and write requests in a first-in-first-out (FIFO) fashion. The use of the single structure helps to decrease the amount of real estate occupied by the request queue and also minimizes the overhead required to maintain logical sub-queues for the requests, where each sub-queue is associated with a given type and priority of request.

Figure 1:
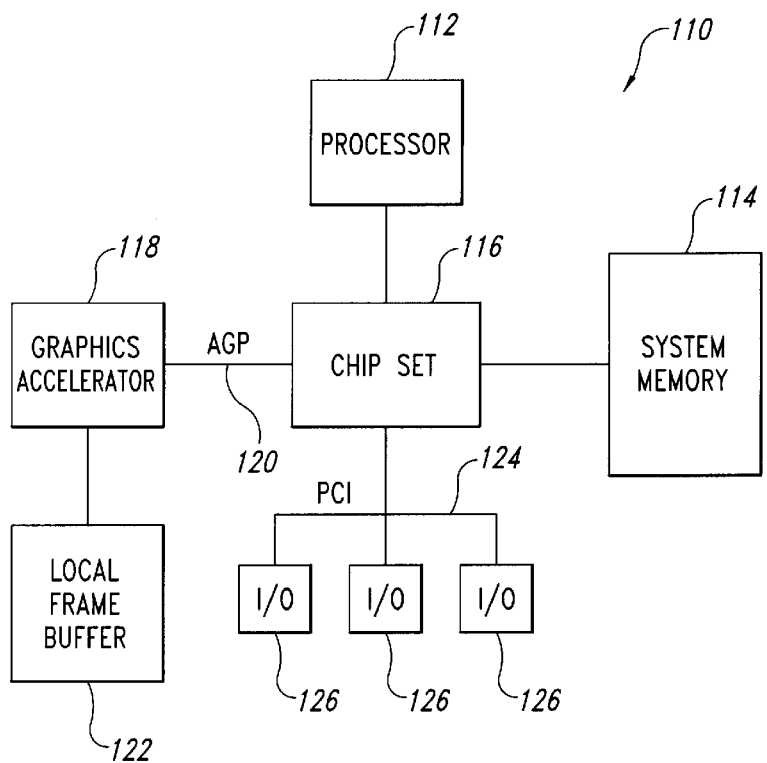
FIG.1 is a block diagram of a computer system that is suitable for practicing an exemplary embodiment to the present invention.

FIG. 1 shows an example of a computer system 110 that is suitable for practicing the present invention. The computer system 110 includes a processor 112 (such as an 80×86 microprocessor) for communicating with a system memory 114 via chips that are part of a chip set 116. An AGP bus 120 carries communications between a graphics accelerator 118 and system memory 114 (e.g., main memory). System memory 114 may be composed of random access memory (RAM) of other types of devices commonly used for main memory. The graphics accelerator 118 is coupled to local frame buffer 122, which holds frames for displaying three-dimensional images. The chip set 116 may also interface with a PCI bus 124 to which input/output (I/O) peripheral devices 126 may be attached. Read/flush and write requests that are sent over the AGP bus as part of AGP transactions may be either high priority or low priority requests. High priority requests take priority over low priority requests. Such requests are part of split AGP transactions, where the request for a read/flush or write is disconnected from the associated data transfer. AGP requires logical sub-queues for queuing high priority requests and low priority requests. (See "AGP Interface Specification" Revision 1.0, July 1996).

Those skilled in the art will appreciate that the present invention may be practiced with computer systems that are configured differently from that shown in FIG. 1. For example, the present invention may also be practiced with multiprocessor architectures. In addition, the computer system may include different components than those shown in FIG. 1.

Figure 2:
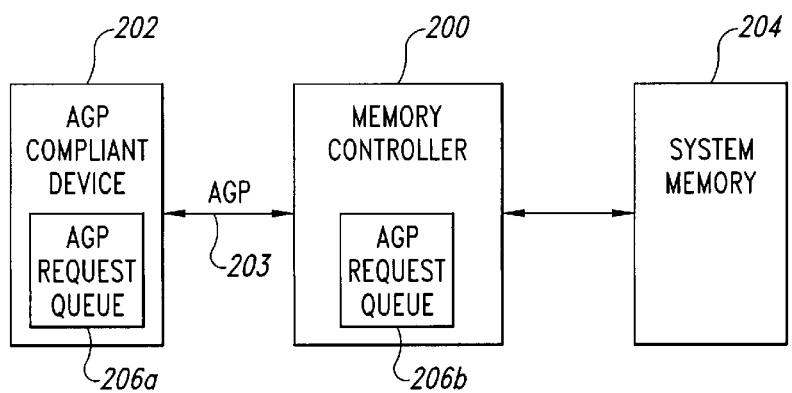
FIG. 2 depicts components of the computer system of FIG. 1 in more detail.

FIG. 2 illustrates the role of the request queue in more detail. An AGP compliant device 202, such as a graphics device 118, communicates with a memory controller 200 over AGP bus 203. More generally, the computer system must include an AGP compliant target (e.g., the memory controller 200) that provides an interface for interpreting AGP addresses and an AGP compliant master (e.g., AGP compliant device 202) that provides an interface for generating pipelined AGP read/write operations. Those skilled in the art will appreciate that the AGP compliant device need not be a graphics accelerator but may also be another type of device that is AGP compliant (ie., a device that complies with the requirements set forth in the AGP interface specification). The memory controller 200 controls access to system memory 204 and may be part of chip set 116. The AGP compliant device 202 includes an AGP read/write request queue 206A for enqueuing read/flush and write requests. The memory controller 200 contains AGP read/write request queue 206B.

AGP supports read operations, write operations, fence operations and flush operations. Read operations entail reading data from system memory and write operations entail writing data into system memory. The read operations may be long read operations where a greater amount of data is read (i.e., up to 256 bytes) than in a standard read operation. Flush operations are similar to a read but flush operations drive all low priority write requests ahead of them to the point where all the results are fully visible to other system agents. Flush operations return a single Q-Word (i.e., 8 bytes) of random data as an indication of completion. Read/flush and write requests for system memory originating from the AGP compliant device 202 are initially queued in the AGP request queue 206A of the AGP compliant device and then sent over the AGP bus 203 to the memory controller 200, where the requests are enqueued in the AGP request queue 206B. The memory controller 200 processes these requests to perform the appropriate read/write/flush operations on system memory 204. Results are returned to AGP compliant device 202.

The AGP request queue can hold anywhere from 0 to 256 entries. The size of the queue is stored in an AGP status register of the AGP-compliant target and the size is passed to the AGP-compliant master during initialization. As a result, the AGP-compliant master is aware of the number of requests that can be outstanding.

Those skilled in the art will appreciate that the present invention does not require the presence of an AGP request queue on both an AGP-compliant device and a memory controller. Instead, the present invention may be practiced with a single AGP request queue.

Figure 3:
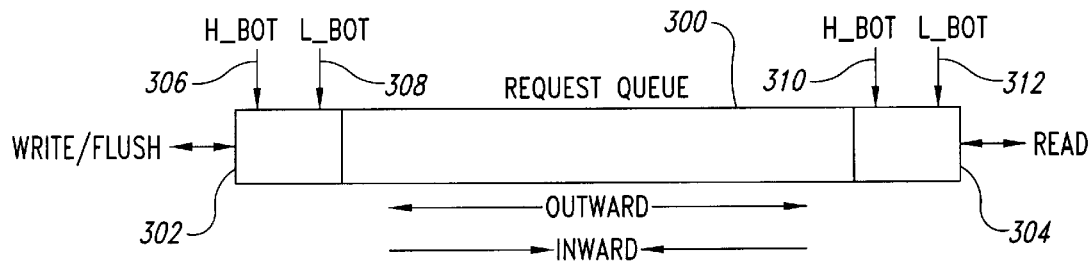
FIG. 3 illustrates the format of the request queue of the exemplary embodiment of the present invention.

FIG. 3 depicts the structure of the AGP read/write request queue 300 (hereinafter "request queue"). Write and flush requests are entered at a first end 302 of the queue. Read/flush requests, in contrast, are entered at the other end 304 of the queue. The request queue 300 is a first-in-first-out (FIFO) queue structure. The request queue 300 encapsulates the following four logical sub-queues: High priority write sub-queue, low priority write sub-queue, high priority read/flush sub-queue and low priority read/flush sub-queue. Each logical sub-queue is associated with a particular type of request (e.g., read/flush or write/flush) and a priority (e.g., high or low). The high priority request entries are situated outward in the queue (i.e., towards the end in which they are received) relative to the low priority request entries. All of the high priority request entries lie outward relative to the low priority request entries. Conversely, the low priority request entries are situated inward relative to high priority request entries. The outward-most high priority request is at the top of the high priority FIFO and is the first request to exit when popped. The outward-most low priority request is at the top of the low priority FIFO and is the first low priority request to exit when popped.

A number of pointers 306, 308, 310 and 312 are maintained for managing the logical sub-queues. For write requests, the H_BOT pointer 306 specifies the bottom of the high priority write sub-queue. Conversely, the L_BOT pointer 308 points to the bottom of the low priority write sub-queue. The H_BOT pointer 310 points to the bottom of the high priority read/flush subqueue and L_BOT pointer 312 points to the bottom of the low priority read/flush sub-queue. The pointers 306, 308, 310, 312 point to the next entry after the last occupied entry in a sub-queue. Thus, for the example shown in FIG. 3, in which all of the sub-queues are empty, the pointers 306, 308, 310 and 312 point to the first entry at the respective ends 302 and 304 of the queue.

The four logical sub-queues of the AGP-compliant target must be able to store "queue depth" entries, where "queue depth" refers to the maximum number of entries that the AGP-compliant target can enqueue. In other words, each logical sub-queue can store from 1 to queue depth entries.

Those skilled in the art will appreciate that the pointers need not be implemented as a pointer data type, but rather may be implemented as indices or as other mechanisms for identifying a location within the queue. Moreover, those skilled in the art will appreciate that additional pointers may be utilized to maintain the logical sub-queues.

Figure 4:
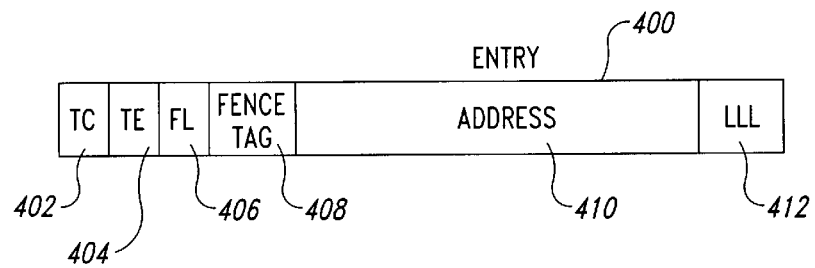
FIG. 4 depicts the format of an entry in the request queue.

FIG. 4 depicts the format of an entry 400 in the request queue 300. Each entry holds a request, such as a write, flush or read/flush request, and has the format depicted in FIG. 4. The entry 400 includes command (CMD) field 406 that holds a code specifying the nature of the associated operation (i.e., command). For a read/flush FIFO entry, a value of "00" specifies a read command, a value of "01" specifies a long read command and a value "1X" (where X is a don't care value) specifies a flush operation. For a write FIFO entry, the value of this field does not matter.

The group tag field 408 is used to facilitate the use of fence commands as specified by the AGP interface specification. Group tags are used to make sure that all low priority requests with the same group tags execute prior to any other low priority requests. The group tag field 408 increments each time a group command is issued and the previous command was not a fence command. As a result, all commands issued between fence commands have the same group tag. The address field 410 may hold an address for the associated read, write or flush operation. Field 412 contains the access length (i.e., number of bytes of data being requested) in units of Q-words 8 bytes or 64 bytes for "long" operations).

Figure 5:
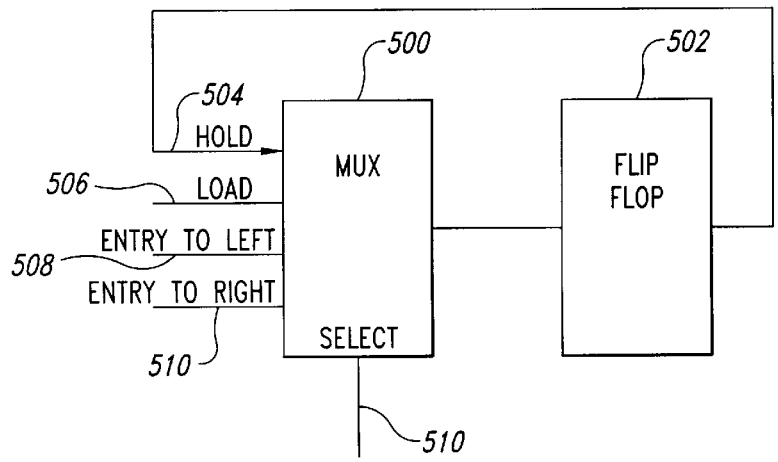
FIG. 5 depicts components that are provided for each bit within the request queue.

FIG. 5 shows a layout for an individual bit within the request queue 300. For each bit, a multiplexer (MUX) 50 and flip-flop 502 are provided. The multiplexer 500 applies a value that is assigned to the flip-flop 502. In particular, the multiplexer has multiple inputs 504, 506, 508 and 510 that may be selected to be applied to the flip-flop 502 depending upon the value applied to the select line 510. The select line 510 may be controlled by an AGP request queue controller program run on a processor in the device that contains the queue. Hold input 504 may be selected to maintain a current value stored within the flip-flop 502. Load input 406 applies a new value that is to be loaded with the flip-flop 502. Entry to left input 508 applies a value that is located to the left of the bit within the respective queue, and entry to the right input 510 applies a value to the flip-flop 502 that is located to the right of the bit within the queue.

Figure 6A:
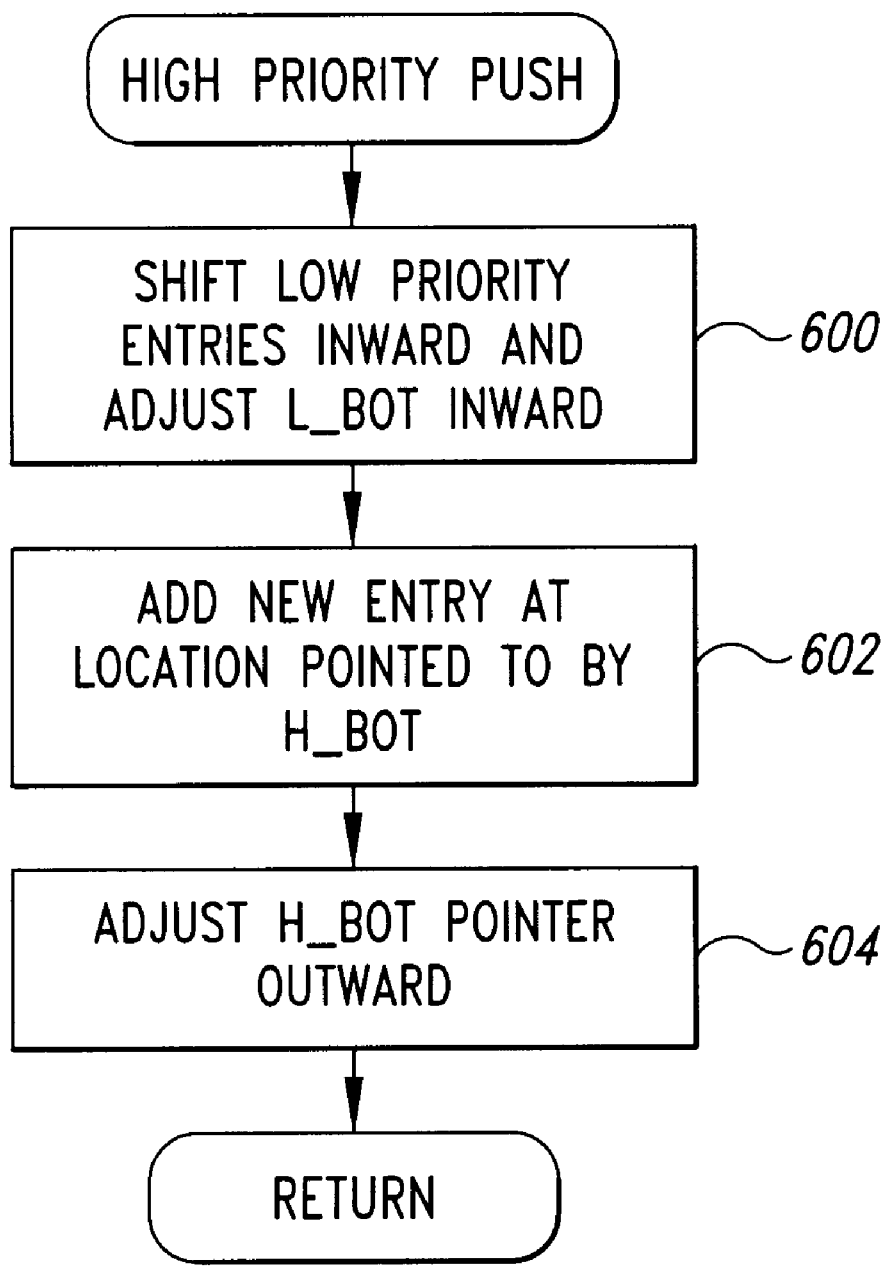
FIG. 6A is a flowchart illustrating the steps that are performed in a high priority push operation.
Figure 6B:
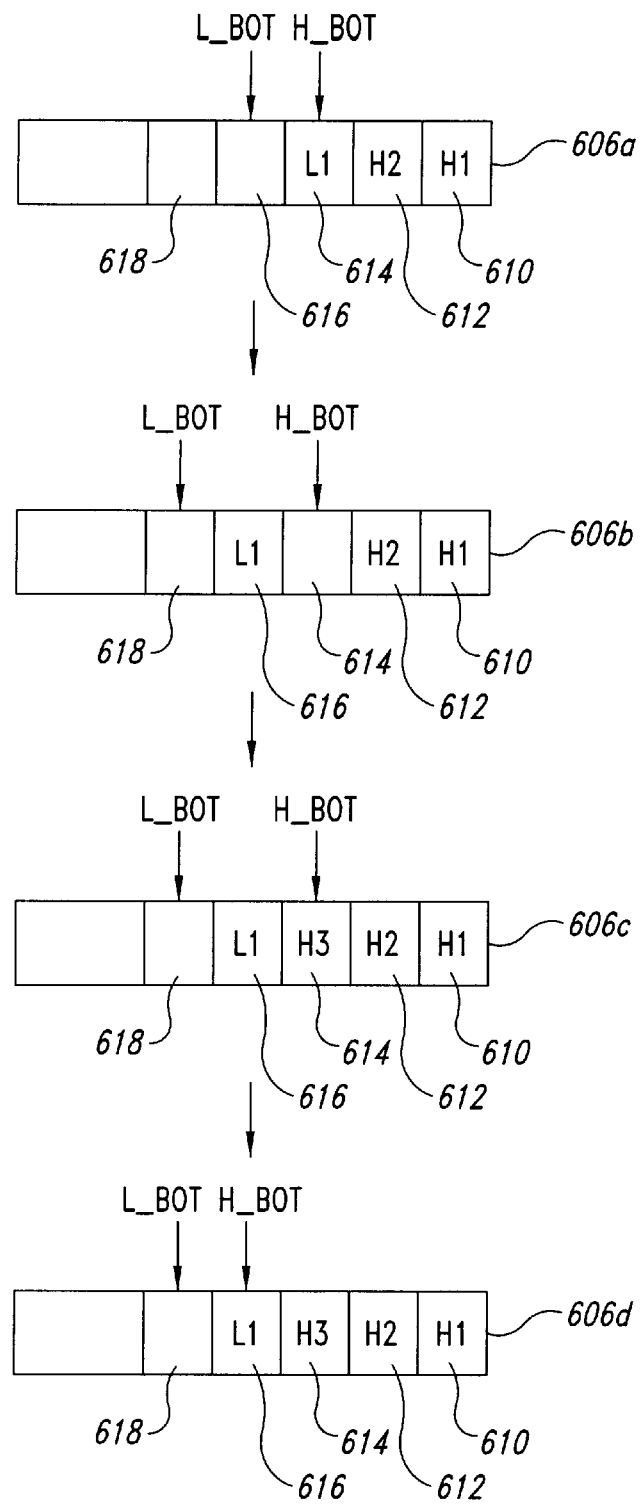
FIG. 6B illustrates an example of a high priority push operation.

The controller manipulates a select line 510 to select among the various inputs 504, 506, 508 and 510 to implement operations on the request queue 300. These operations will be described in more detail below. The request queue 300 supports a high priority push command that pushes a high priority request entry onto the request queue. The end of the queue to which the high priority request entry is pushed depends upon the type of operation requested (i.e., whether the request is a write request or read/flush request). In either case, the high priority push operation performs the steps depicted in FIG. 6A. This flow chart will be described below relative to an example depicted in FIG. 6B. Initially, one end of the request queue 300 appears in state 606A as shown in FIG. 6B. A first high priority request entry H1 is stored in location 610 and a second high priority request entry H2 is stored in location 612. A low priority request entry L1 is stored at location 614 within the request queue. The L_BOT pointer points to location 616 and the H_BOT pointer points to location 614. The low priority request entries are shifted inward one location each, and the L_BOT pointer is adjusted inward one location (step 600 in FIG. 6A). For the examples depicted in FIG. 6B, the queue appears in state 606B such that the L1 request entry is in location 616 and the L_BOT pointer points at location 618. The new request entry is the added to the location pointed to by H_BOT (step 602 in FIG. 6A). In an example shown in FIG. 6B, the newly pushed high priority request entry H3 is added at location 614. The H_BOT pointer must then be adjusted inward one location (step 604 in FIG. 6A). As a result, the H_BOT pointer points to location 616.

Figure 7A:
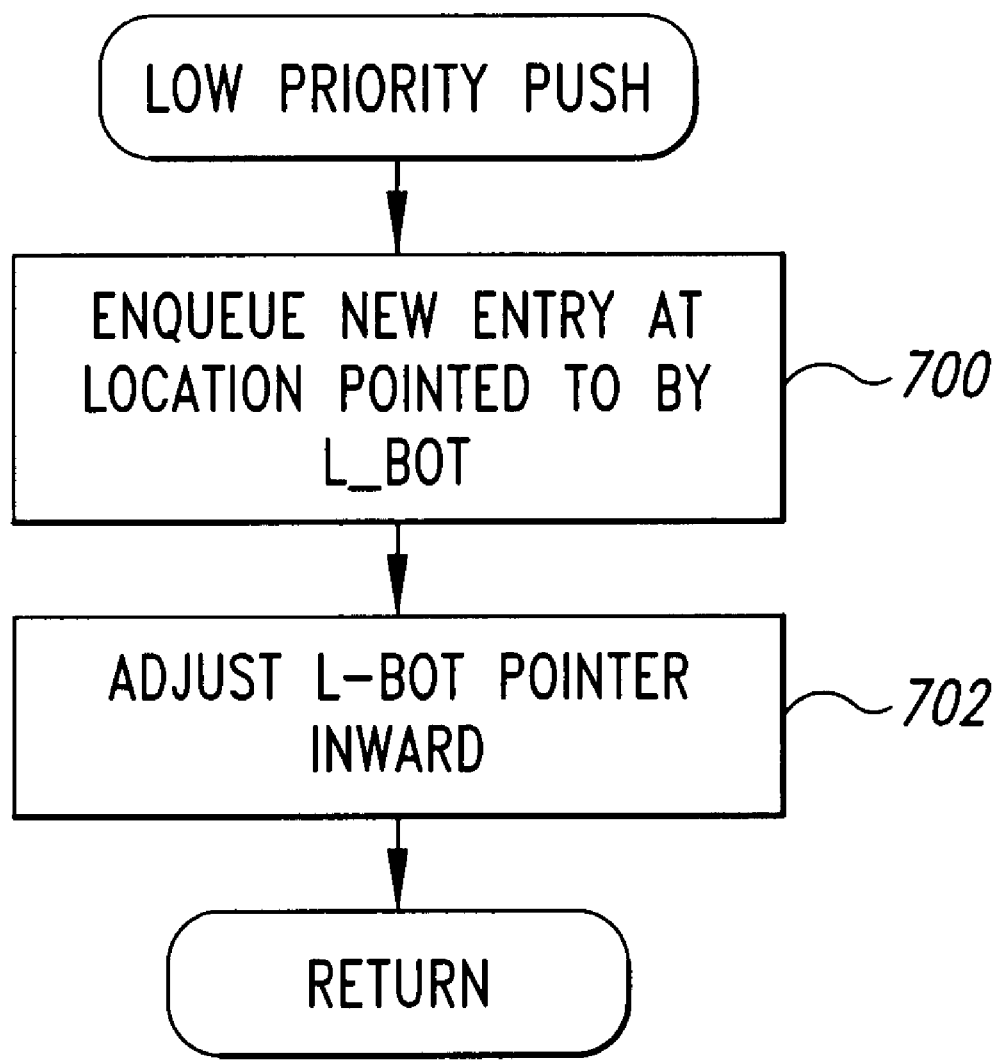
FIG. 7A is a flowchart illustrating the steps that are performed in a low priority push operation.
Figure 7B:
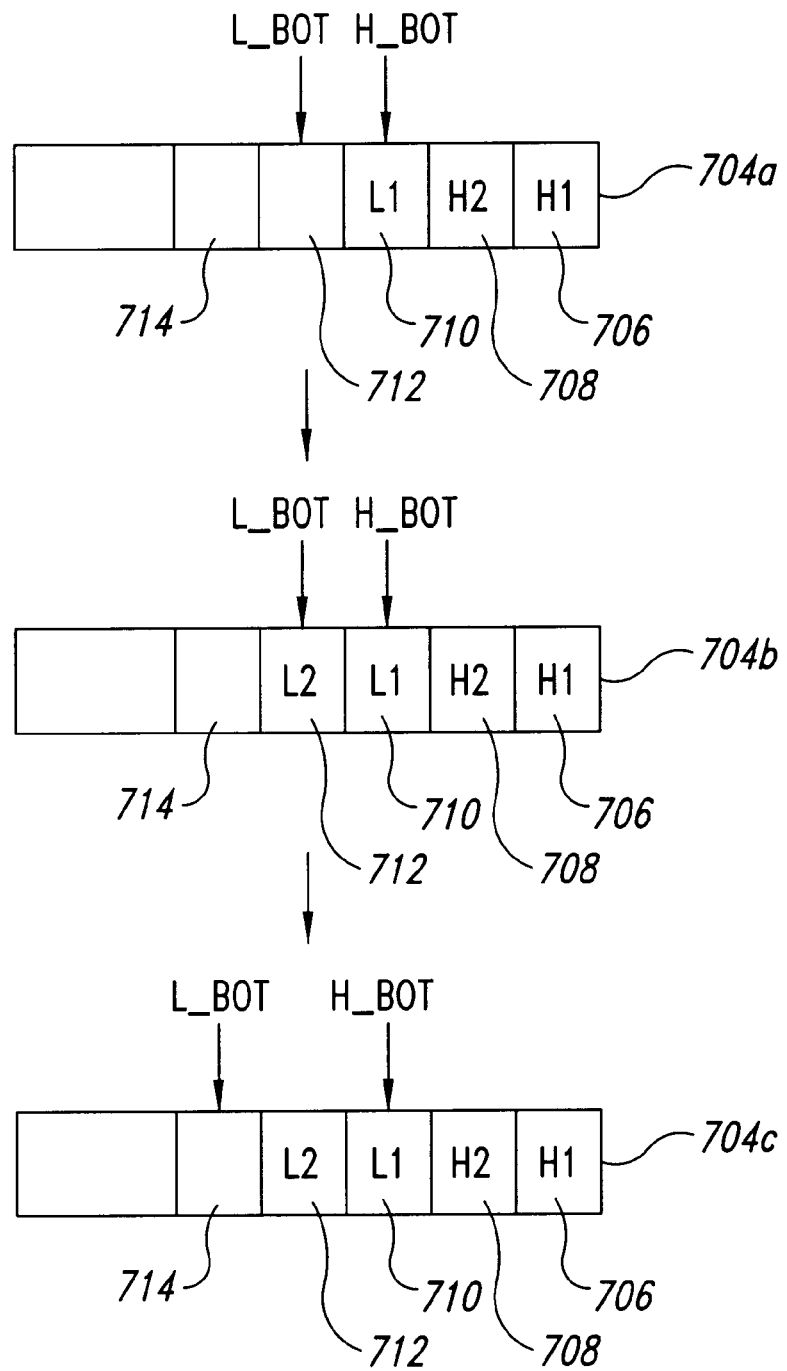
FIG. 7B illustrates an example of a low priority push operation.

FIG. 7A shows a flow chart of the steps that are performed in a low priority push operation. FIG. 7B shows an example of a low priority push operation. Initially, the new low priority request entry is enqueued at a location that is pointed to by the L_BOT pointer (step 700 in FIG. 7A). In an example shown in FIG. 7B, the queue appears in state 704A with the L_BOT pointer pointing to location 712 and the H_BOT pointer pointing to location 710. High priority request entry H1 is stored at location 706, and high priority request entry H2 is stored at location 708. Low priority entry request L1 is stored at location 710. After step 700, low priority request entry L2 is enqueued at location 712 that is pointed to by the L_BOT pointer (see state 704B in FIG. 7B). The L_BOT pointer is then adjusted inward one location to account for the addition of the new request entry L2 at location 712 (step 702 in FIG. 7A). Thus, the L_BOT pointer points to location 714 in FIG. 7B.

Figure 8A:
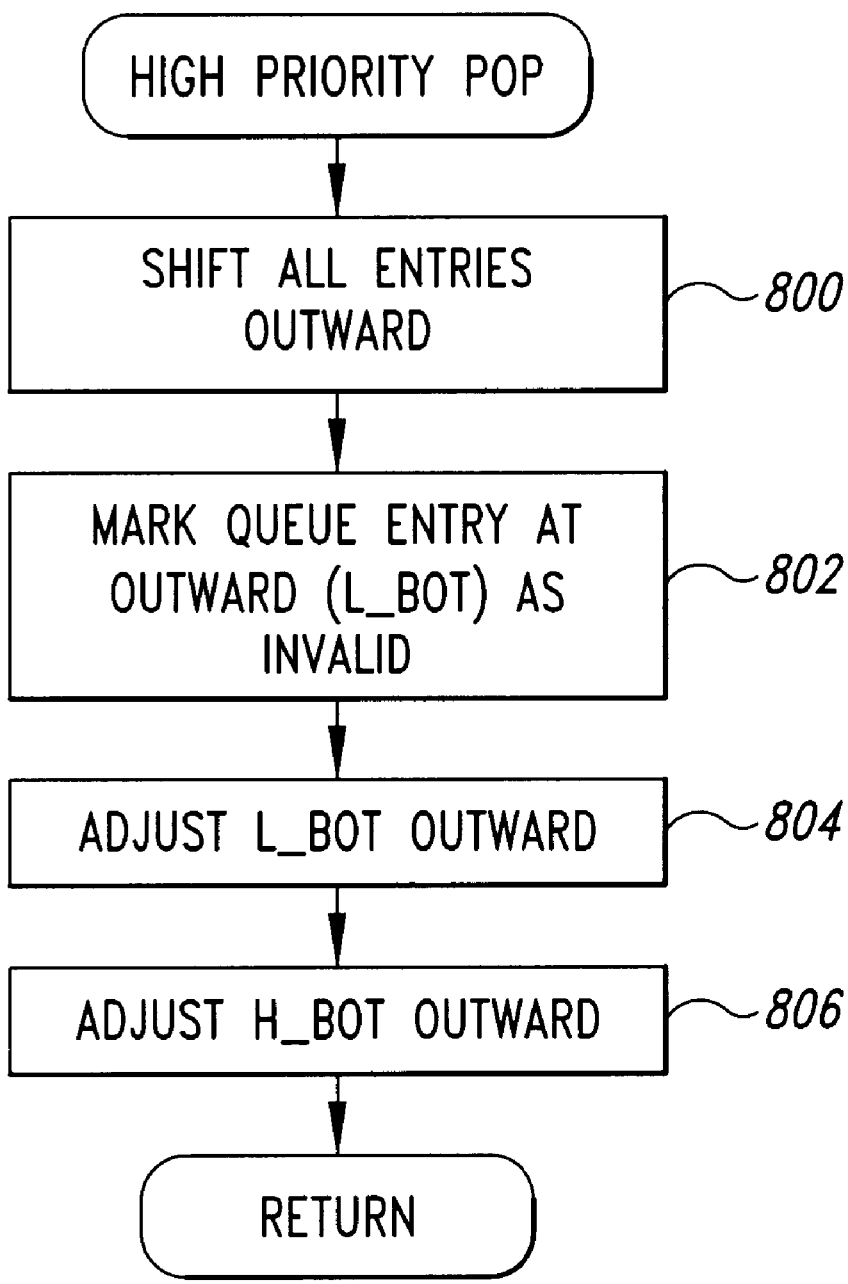
FIG. 8A a flowchart illustrating the steps that are performed in a high priority pop operation.
Figure 8B:
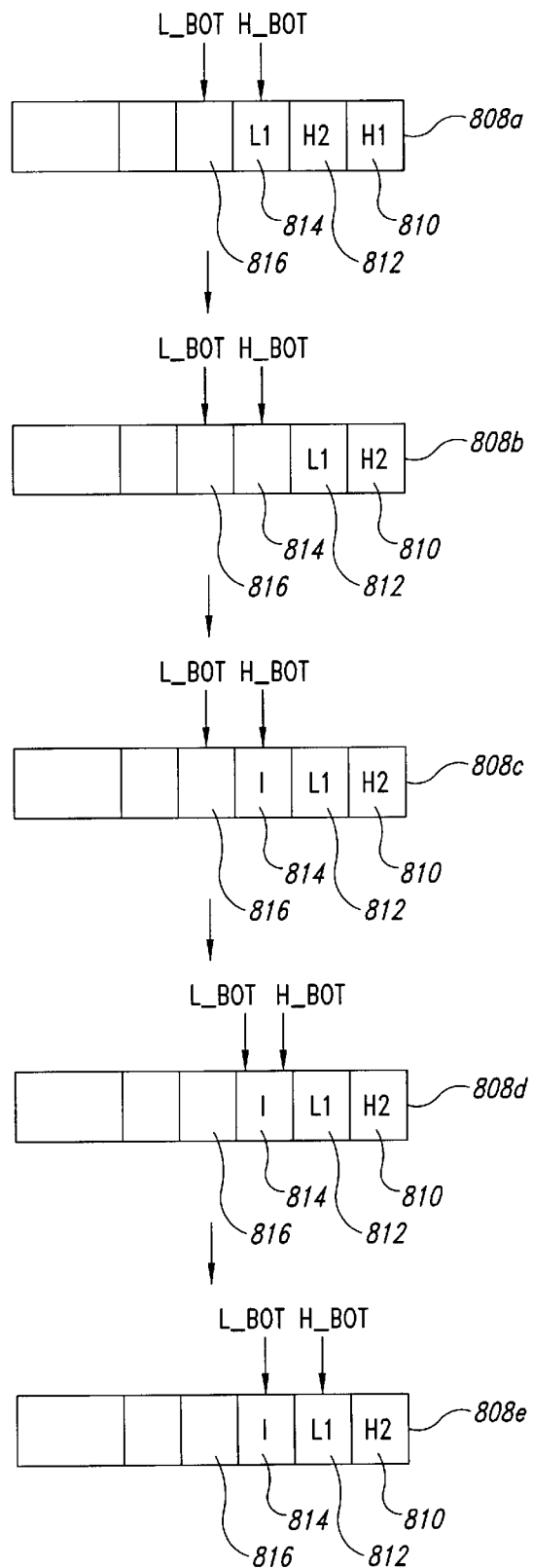
FIG. 8B illustrates an example of a high priority pop operation.

FIG. 8A is a flow chart illustrating the steps performed in a high priority pop operation. The high priority pop operation pops a high priority request entry from the request queue. First, all request entries in the respective half of the request queue devoted to the type of operation (i.e., read/flush or write/flush) are shifted outward one location (step 800 if FIG. 8A). FIG. 8B shows an example where initially the queue is in state 808A with high priority request entry H1 at location 810 and high priority request entry H2 at location 812. Low priority request entry L1 is at location 814. The H_BOT pointer points to location 814, and the L_BOT pointer points to location 816. After all of the entries are shifted outward, as in step 800 of FIG. 8A, the queue is in state 808B, the H2 request entry is stored at location 810, and the L1 request entry is stored at location 812. The L_BOT pointer is then adjusted outward one location (step 804 in FIG. 8A) as is the H_BOT pointer (step 806 in FIG. 8A). Hence, as shown in state 808C, the L_BOT pointer points to location 814 and as shown in state 808D, the H_BOT pointer points to location 812.

Figure 9A:
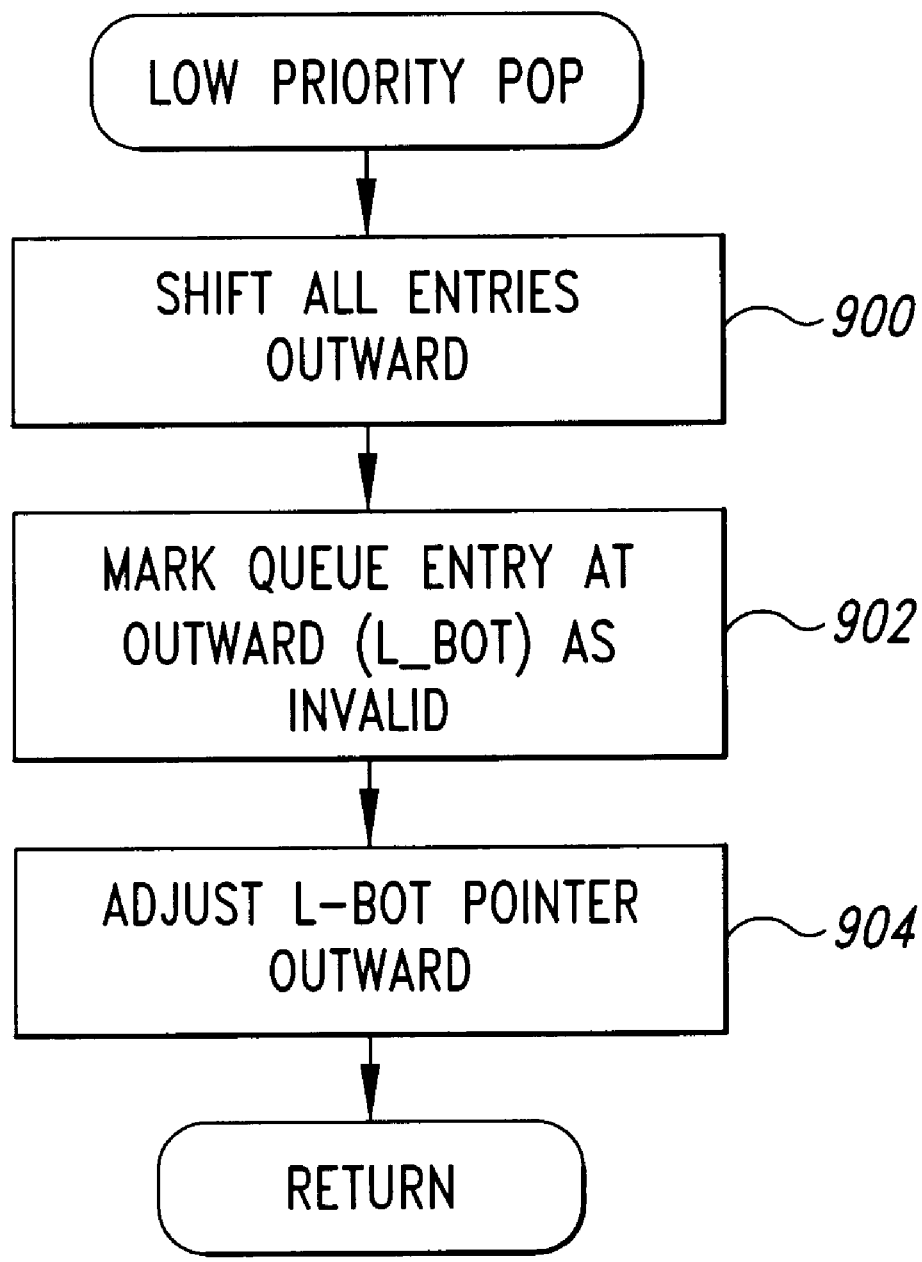
FIG. 9A is a flowchart illustrating the steps that are performed in a low priority pop operation.
Figure 9B:
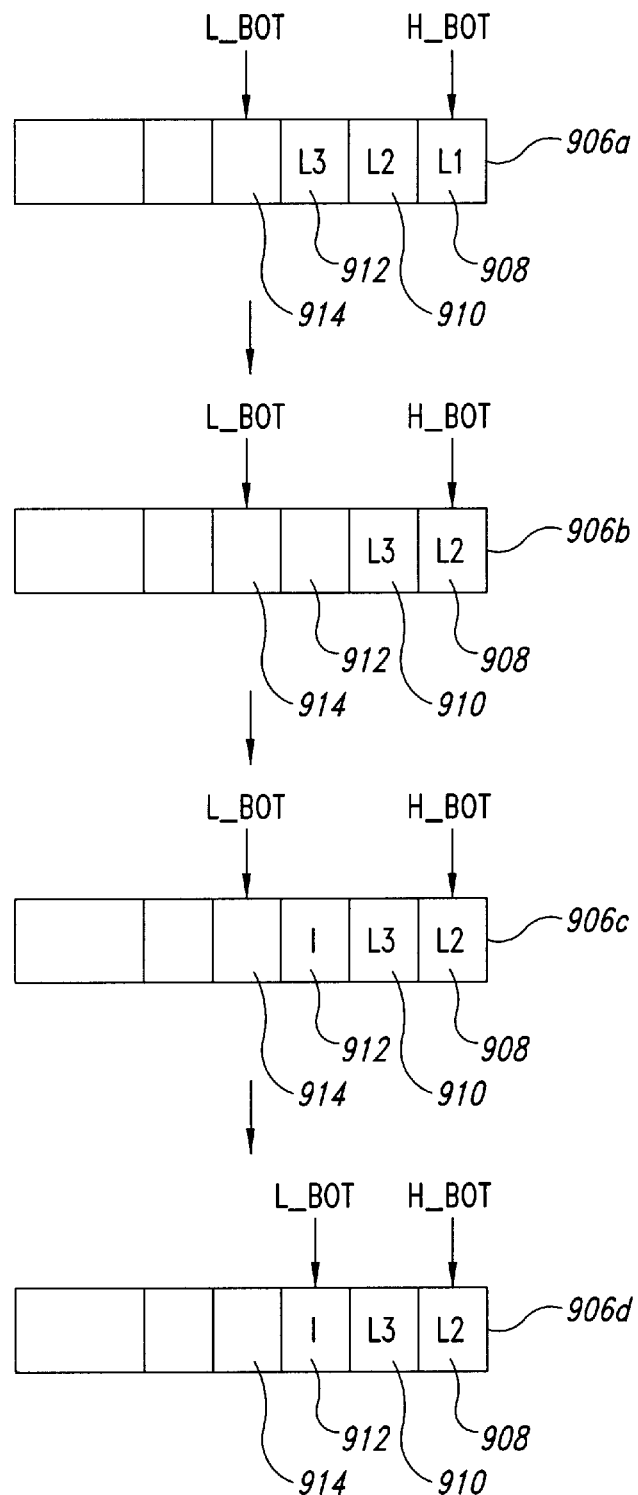
FIG. 9B illustrates an example of a low priority pop operation.

FIG. 9A is a flow chart illustrating the steps that are performed in the low priority pop operation for popping a low priority request entry from the request queue. Initially all entries are shifted outward one location (step 900 in FIG. 9A). FIG. 9B shows an example of the effect of a low priority pop operation. Initially, the queue appears in state 906A with low priority request entries L1, L2 and L3 in locations 908, 910 and 912, respectively. The H_BOT pointer points to location 908 and the L_BOT pointer points to location 914. After the entries are shifted outward, the queue appears in state 906B where low priority request entry L2 is at location 908 and low priority request L3 is at location 910. The L_BOT pointer is then adjusted outward one location (step 904 in FIG. 9A). FIG. 9B shows the queue in state 906C where the L_BOT pointer has been adjusted to point at location 912.

Figure 10A:
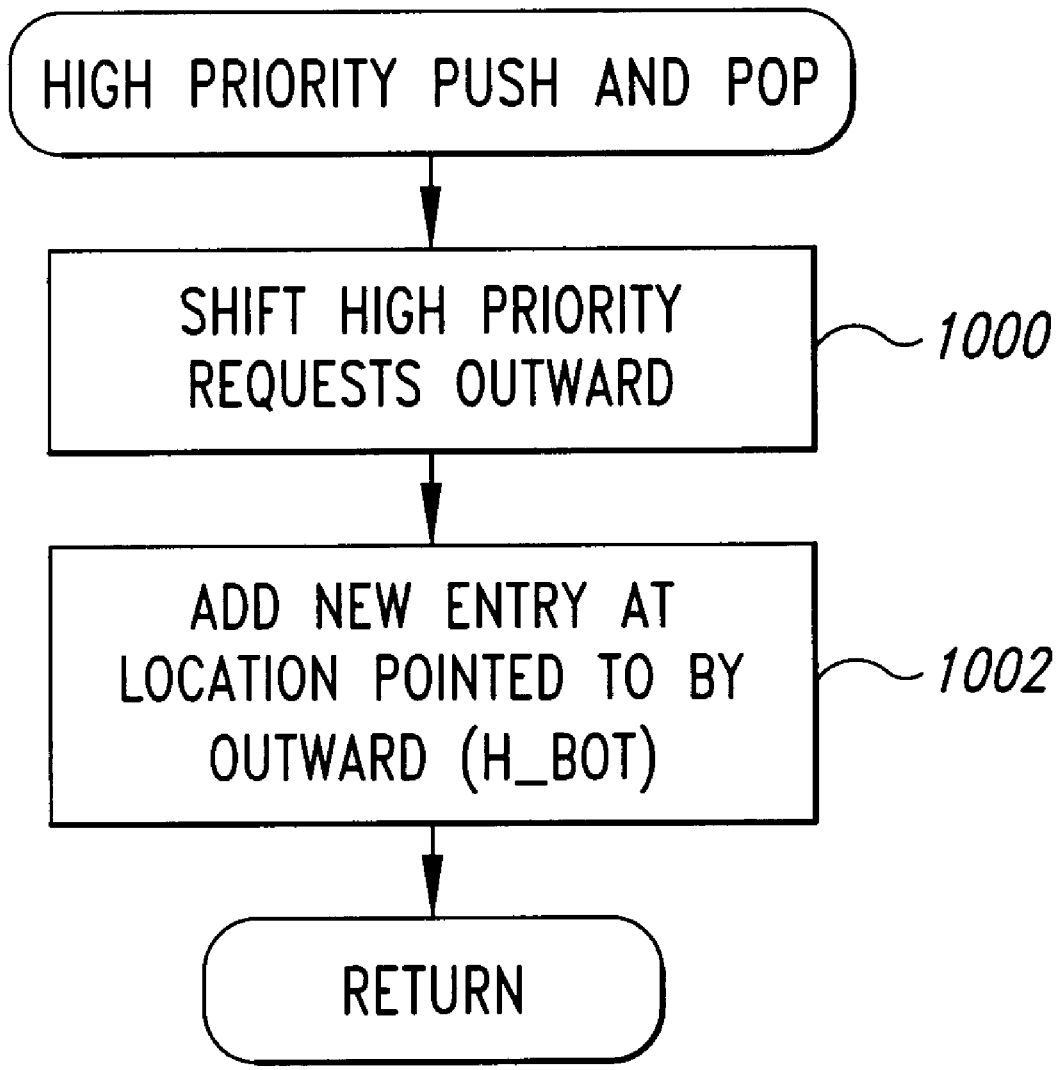
FIG. 10A is a flowchart illustrating the steps that are performed in a high priority push and high priority pop operation.
Figure 10B:
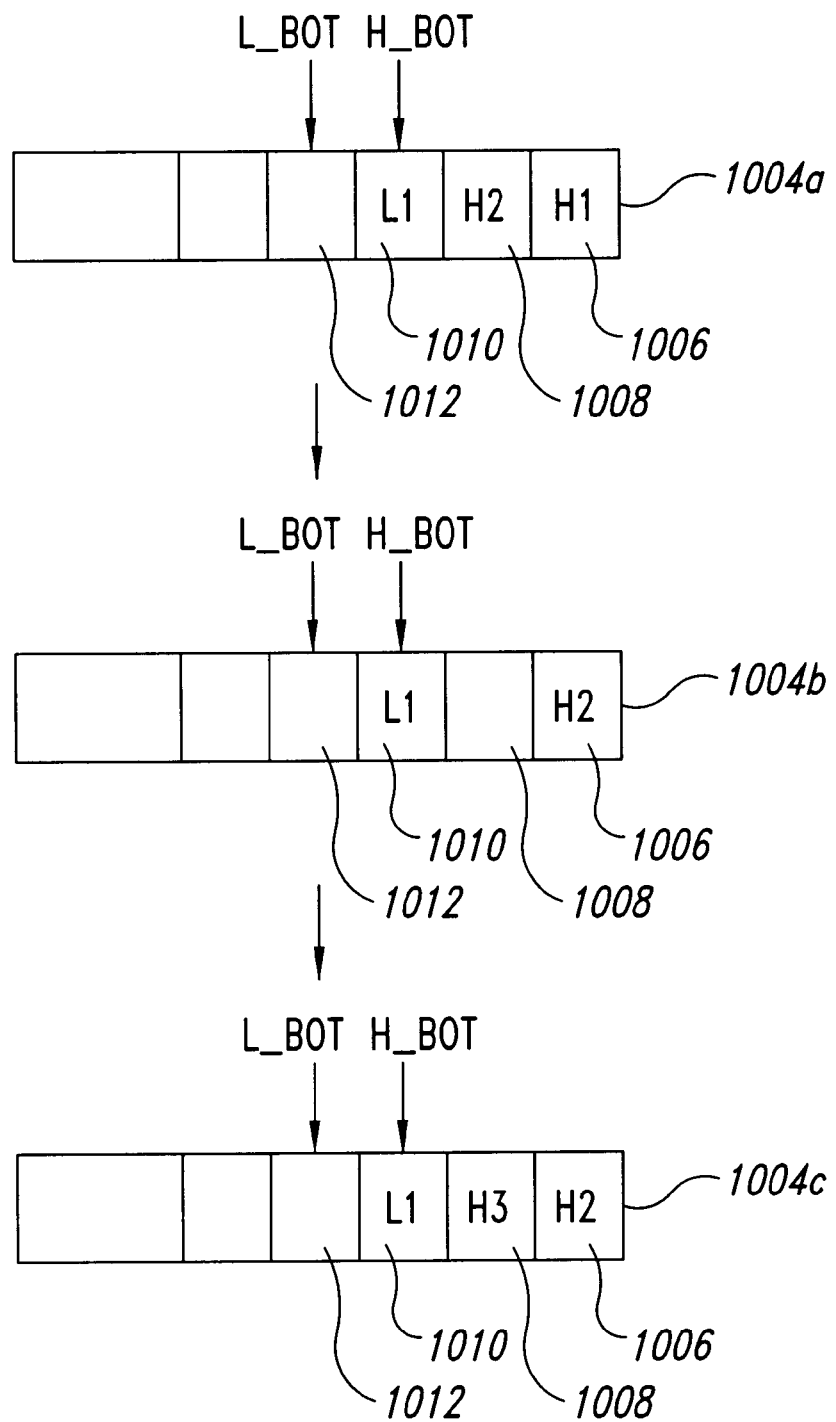
FIG. 10B illustrates an example of a high priority push and high priority pop operation.

The request queue is also capable of performing joint operations that include both pushes and pops. FIG. 10A is a flow chart illustrating the steps that are performed to jointly perform a high priority push and high priority pop. Initially, the high priority request entries are shifted outward one location (step 1000 of FIG. 10A). FIG. 10B shows an example where the queue appears in state 1004A with high priority request entries H1 and H2 at locations 1006 and 1008, respectively. A low priority request entry L1 is stored at location 1010. The L_BOT pointer points to location 1012, and the H_BOT pointer points to location 1010. After the high priority request is shifted outward, the queue appears in state 1004B. In particular, high priority request entry H2 is at position 1006. The high priority request entry H1 has been popped off the queue. The new high priority entry is then added to the location that is one location outward of the H_BOT pointer (step 1002 in FIG. 10A). In an example shown in FIG. 10B, the new entry is added to location 1008. As a result, the new high priority entry is added at the appropriate place within the high priority sub-queue and the L_BOT and H_BOT pointers are pointed at the appropriate locations.

Figure 11A:
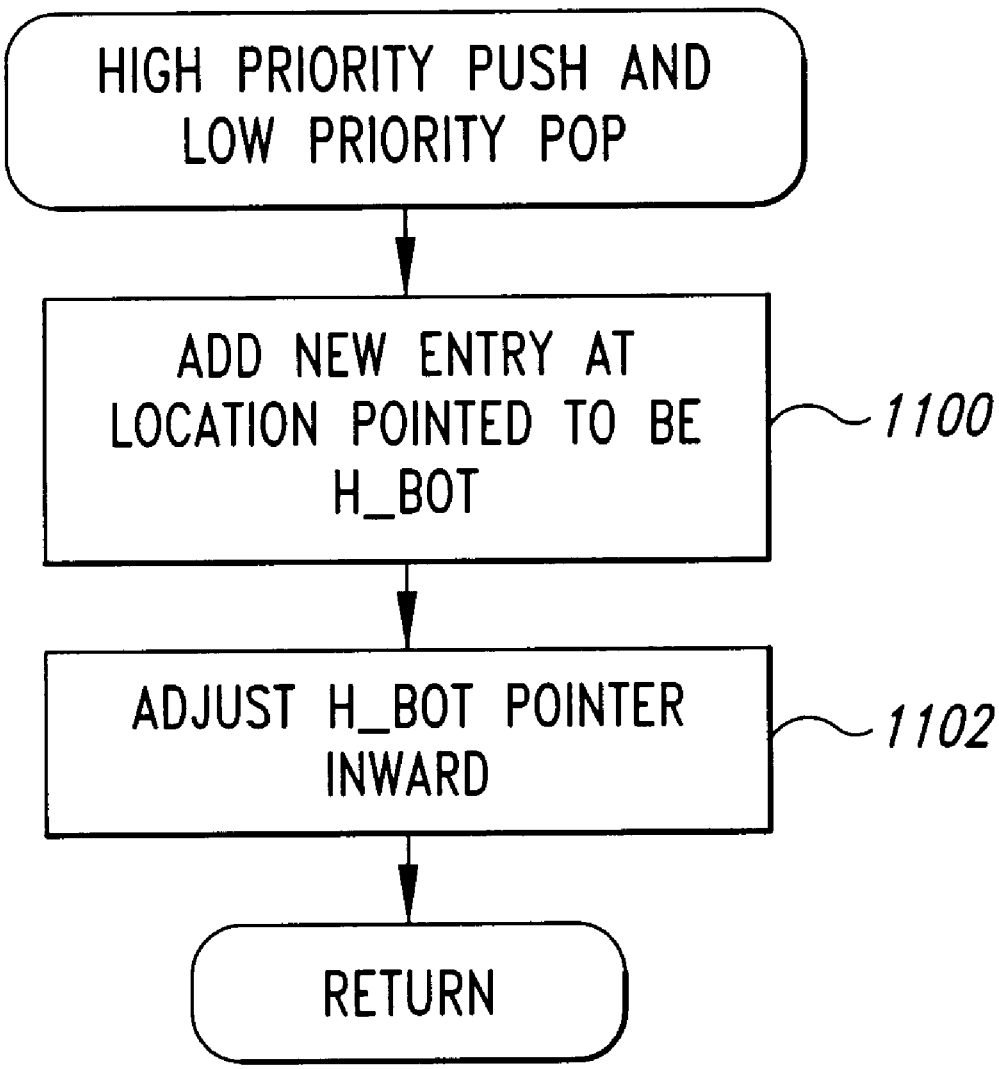
FIG. 11A is a flowchart illustrating the steps that are performed in a high priority push and low priority pop operation.
Figure 11B:
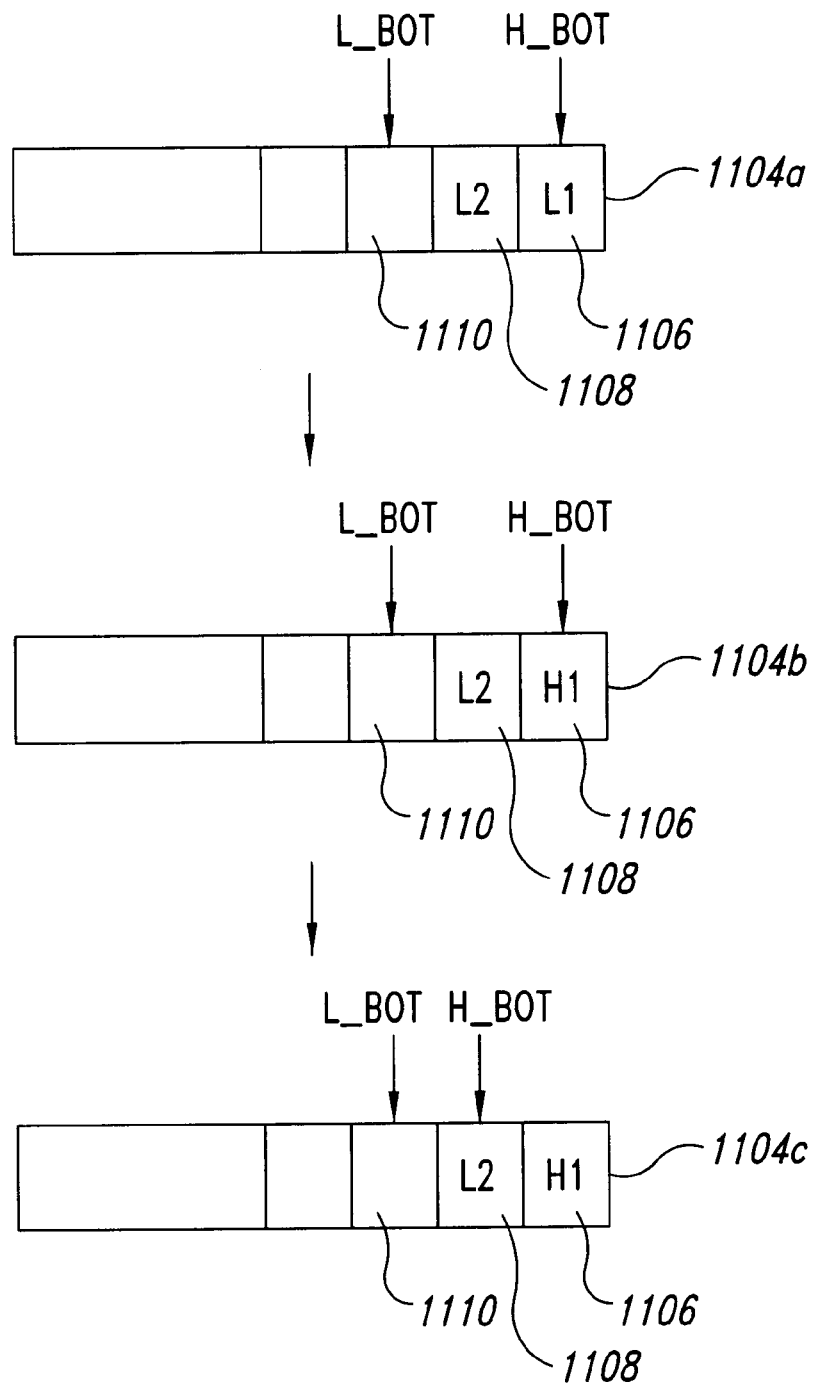
FIG. 11B illustrates an example of a high priority push and a low priority pop operation.

A high priority push and low priority pop combination operation may also be performed in the request queue. FIG. 11A is a flow chart illustrating the steps for such a combination operation. The low priority request entry at the front of the queue is removed and the new high priority request entry is added to the location, which is pointed to by the H_BOT pointer (step 1100 in FIG. 11A). FIG. 11B shows an example where the queue appears in state 1104A where low priority request entry L1 is at location 1106 and low priority request entry L2 is at location 1108. The L_BOT pointer points to location 1110 and the H_BOT pointer points to location 1106. When the low priority request entry L1 is popped off the queue and the high priority request entry is pushed onto queue, the queue appears as in state 1104B. The newly pushed high priority request entry H1 is at location 1106. The H_BOT pointer then must be adjusted inward to accommodate the push (step 1102 in FIG. 11A). In an example shown in FIG. 11B, the H_BOT pointer is adjusted to point to location 1108, as shown in state 1104C.

Figure 12A:
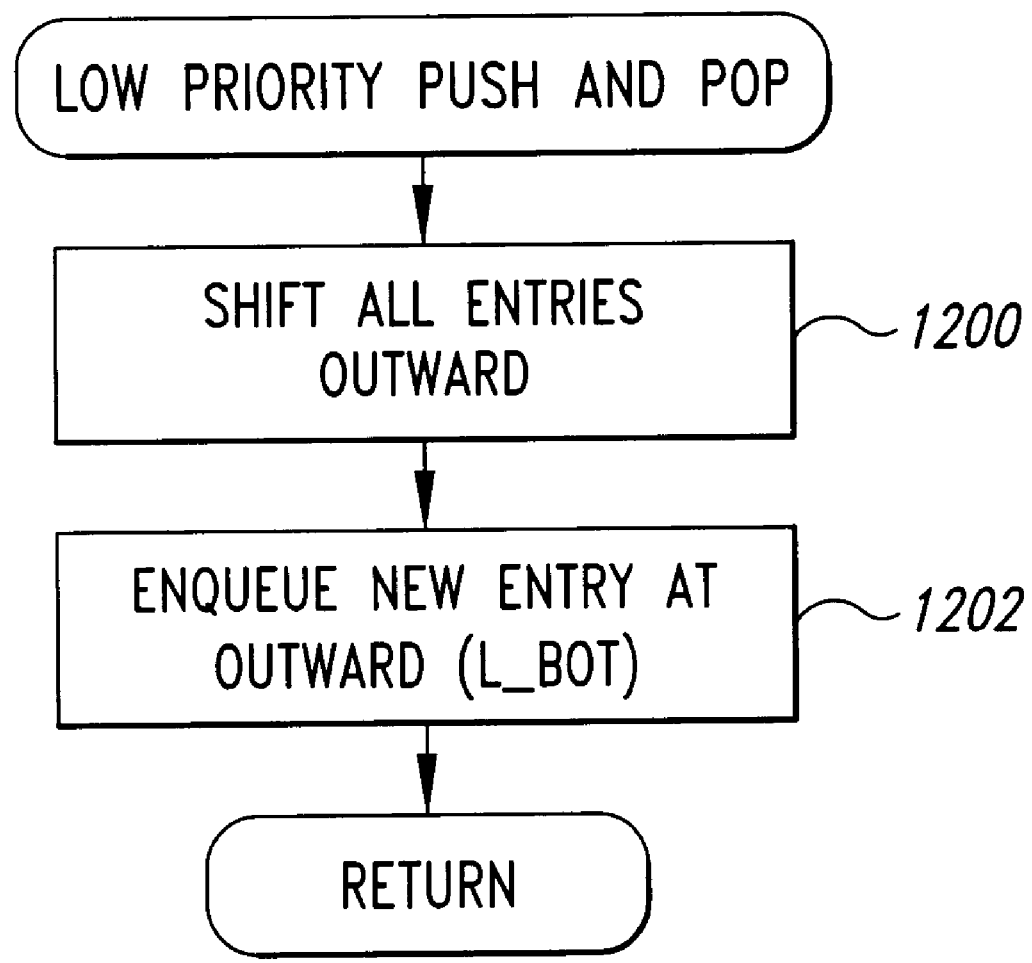
FIG. 12A is a flowchart illustrating the steps that are performed in a low priority push and a low priority pop operation.

FIG. 12A is a flow chart that illustrates the steps that are performed for a combination of low priority push with low priority pop.

Figure 12B:
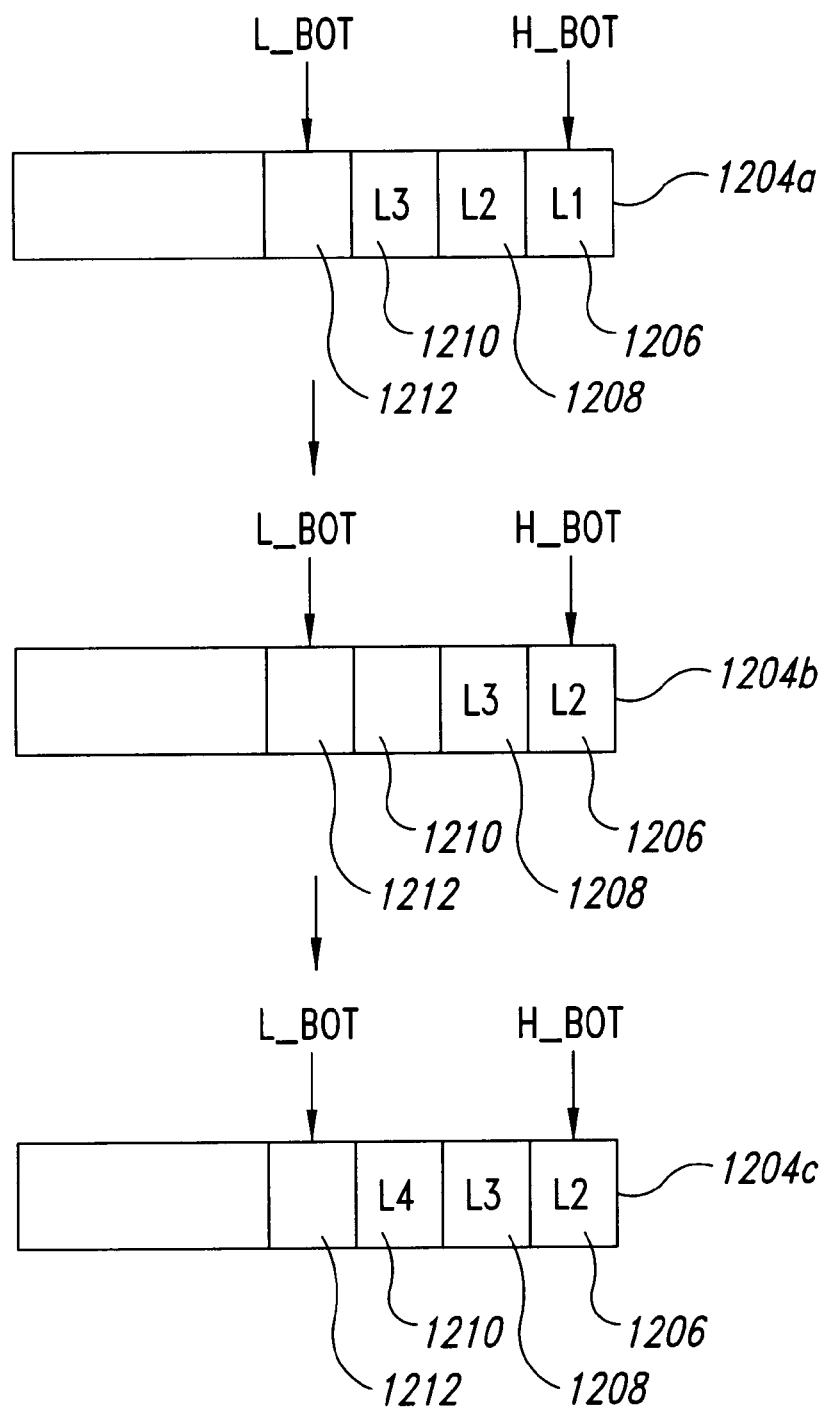
FIG. 12B illustrates an example of a low priority push and a low priority pop operation.

FIG. 12B shows an example of such a joint operation. Initially, the queue appears in state 1204A with low priority request entries L1, L2 and L3 at locations 1206, 1208 and 1210 respectively. The L_BOT pointer points to location 1212, and the H_BOT pointer points to location 1206. The operation begins by shifting all the request entries outward one location (step 1200 in FIG. 12A). In particularly, the L1 request entry is popped off the queue, and the other request entries are pushed outward. For the example depicted in FIG. 12B, the queue appears in state 1204B with the L2 request entry at location 1206 and the L3 request entry at location 1208. The new request entry is then enqueued at the location that is one location outward relative to the L_BOT pointer (step 1202 in FIG. 12A). FIG. 12B shows the state 1204C of the queue after this enqueuing of the new request entry L4 at location 1210.

Figure 13A:
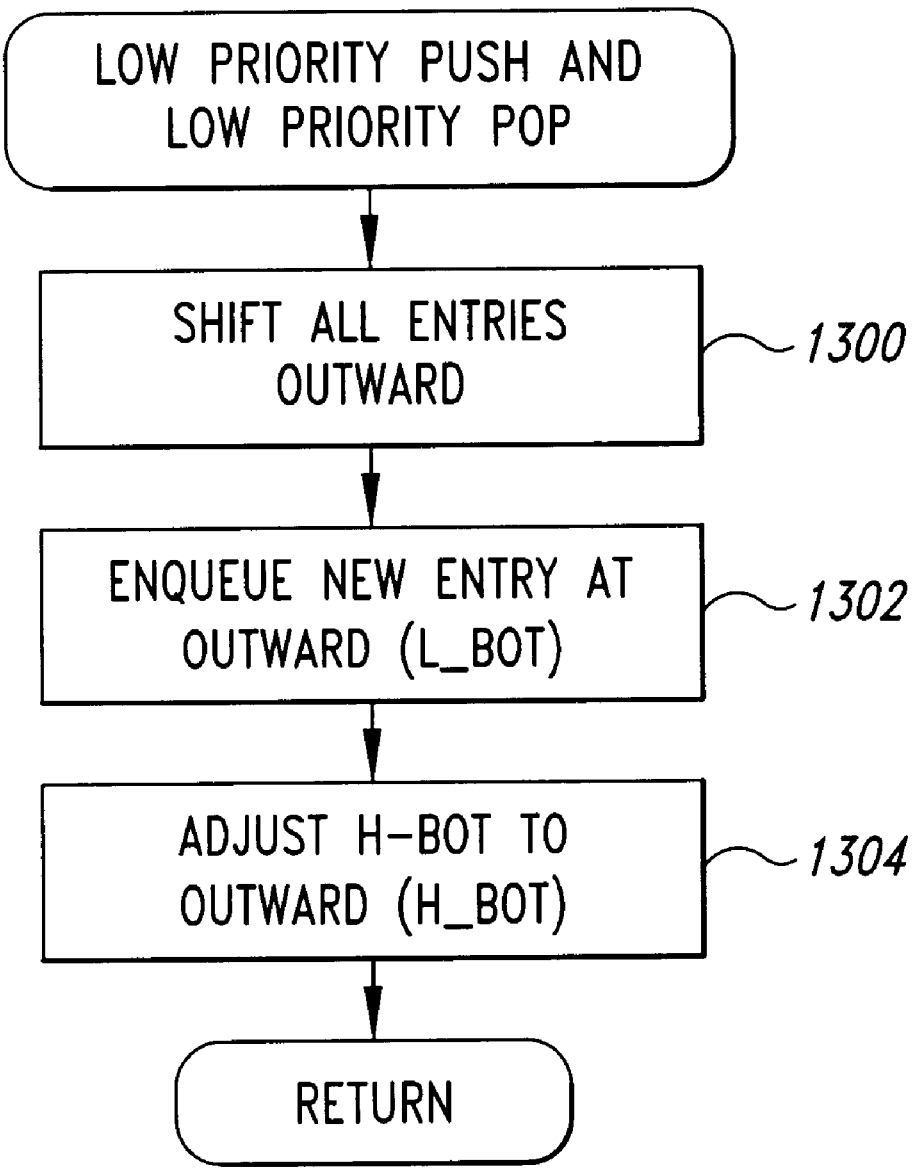
FIG. 13A is a flowchart illustrating the steps that are performed in a low priority push and a high priority pop operation.
Figure 13B:
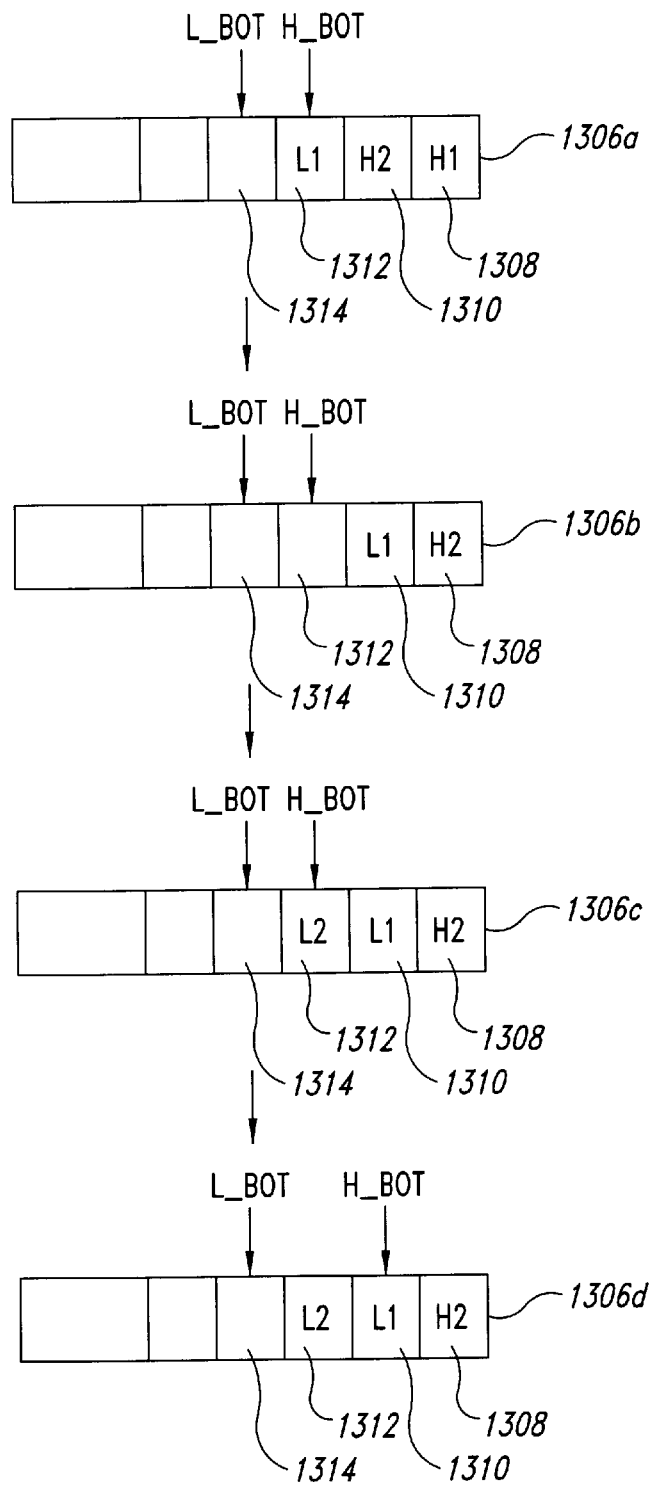
FIG. 13B illustrates an example of a low priority push and a high priority pop operation.

FIG. 13A is a flow chart that illustrates the steps that are performed in the combination operation of a low priority push with a high priority pop. FIG. 13B shows an example of such a combination operation. Initially, the queue appears in state 1306A with high priority request entries H1 and H2 at locations 1308 and 1310, respectively. Low priority request entry L1 is at location 1312. The L_BOT pointer points to location 1314 and H_BOT pointer points to location 1312. The leading high priority request entry H1 is popped off the queue and the entries are shifted outward one location (step 1300 in FIG. 13A). As a result, for the example depicted in 13B, the queue appears in state 1306B with low priority request entry L1 at location 1310 and high priority request entry H2 at location 1308. The new low priority request entry L2 is then added at the location that is one location outward of the location pointed to by the L_BOT pointer (see step 1302 in FIG. 13A). In an example shown in FIG. 13B, the L2 request entry is added at location 1312 so that the request queue is in state 1306c. The H_BOT pointer then must be adjusted outward one location. In the example shown in FIG. 13B, the H_BOT pointer is adjusted outward to location 1310 so the queue is in state 1306d.

While the present invention has been described with the reference to a preferred embodiment thereof, those skilled in the art will appreciate various changes in form and detail may be made without departing from the intended scope of the present invention as defined in the appended claims.

I claim:

1. A computer system comprising:
   an accelerated graphics port (AGP) bus;
   an AGP-compliant master device having an interface for generating low priority read requests, high priority read requests, low priority write requests and high priority write requests;
   an AGP-compliant target device having an interface for interpreting low priority read requests, high priority read requests, low priority write requests and high priority write requests;
   an AGP request queue on the AGP-compliant master device for enqueuing low priority read requests, high priority read requests, low priority write requests and high priority write requests.

2. The computer system of claim 1 wherein the AGP-compliant master device is a graphics accelerator.

3. The computer system of claim 1 wherein the computer system includes system memory and wherein the AGP-compliant target device is a memory controller for managing access to the system memory.

4. The computer system of claim 1 wherein the AGP request queue is divided into logical sub-queues, including a low priority read request sub-queue for holding low priority read requests and a high priority read request sub-queue for holding high priority read requests.

5. The computer system of claim 4 wherein the AGP request queue includes a logical low priority write request sub-queue for holding low priority write requests and a logical high priority write request sub-queue for holding high priority write requests.

6. The computer system of claim 1 wherein the AGP request queue is divided into logical sub-queues, including a low priority write request sub-queue for holding low priority write requests and a high priority write request sub-queue for holding high priority write requests.

7. The computer system of claim 1 wherein the AGP request queue is divided into logical sub-queues wherein each sub-queue is a first-in-first-out (FIFO) sub-queue.

8. The computer system of claim 7 wherein each sub-queue holds a given type of request of a given priority.

9. In a computer system having a memory that is responsive to read requests and write requests of multiple priorities, including a lower priority and a higher priority, a single queue structure for enqueuing the read requests and the write requests of multiple priorities, comprising:

a lower priority logical sub-queue for holding at least some of the lower priority requests in a first-in-first-out (FIFO) fashion; and a higher priority logical sub-queue for holding at least some of the higher priority requests in a FIFO fashion, wherein all of the higher priority requests stored in the higher priority sub-queue must be removed from the queue before any of the lower priority requests can be removed from the lower priority sub-queue.

10. The queue structure of claim 9 wherein the sub-queues hold read requests.

11. The queue structure of claim 9 wherein the sub-queues hold write requests.

12. The queue structure of claim 9 wherein the read requests and write requests are accelerated graphics port (AGP) operations.

13. The queue structure of claim 9, further comprising an additional lower priority sub-queue for holding at least some of the lower priority requests in a FIFO fashion.

14. The queue structure of claim 13, further comprising an additional higher priority sub-queue for holding at least one of the higher priority requests.

15. The queue structure of claim 9, further comprising an additional higher priority sub-queue for holding at least one of the higher priority requests.

16. In a data processing system, a queue comprising:

a first end to which requests of a first type are popped and pushed;

a second end to which requests of a second type are popped and pushed;

a first low priority logical sub-queue at the first end for storing low priority requests of the first type;

a first high priority logical sub-queue at the first end for storing high priority requests of the first type, wherein high priority requests of the first type in the high priority sub-queue are positioned outward in the queue towards the first end relative to where low priority requests of the first type in the first low priority sub-queue are positioned in the queue.

17. The queue of claim 16, further comprising a second low priority logical sub-queue at the second end for storing low priority requests of the second type.

18. The queue of claim 17, further comprising a second high priority logical sub-queue at the second end for storing high priority requests of the second type, wherein high priority requests of the second type are positioned outward in the queue towards the second end relative to where low priority requests of the second type in the second low priority sub-queue are positioned in the queue.

19. The queue of claim 16, further comprising second high priority logical sub-queue at the second end for storing high priority requests of the second type.

20. The queue of claim 16 wherein the requests of the first type are read requests for reading data.

21. The queue of claim 16 wherein the requests of the first type are write requests for writing data.

* * * * *

UNITED STATES PATENT AND TRADEMARK OFFICE
CERTIFICATE OF CORRECTION

PATENT NO. : 5,903,776
DATED : May 11, 1999
INVENTOR(S) : Douglas A. Larson

It is certified that error appears in the above-identified patent and that said Letters Patent is hereby corrected as shown below:

Column 2, line 57        reads "8A a flowchart"        should read - - 8A is a flowchart - -

Column 7, line 57        reads "12B"        (should be part of previous paragraph)

Signed and Sealed this

Eighth Day of May, 2001

*Attest:*

NICHOLAS P. GODICI

*Attesting Officer*    *Acting Director of the United States Patent and Trademark Office*